United States Patent Office 3,663,660
Patented May 16, 1972

3,663,660
PROCESS FOR THE PREPARATION OF A CATALYST USEFUL FOR THE POLYMERIZATION OF OLEFINS
Andre Delbouille and Yves Gobillon, Brussels, and Jacques Stevens, Braine-l'Alleud, Belgium, assignors to Solvay & Cie, Brussels, Belgium
Filed June 18, 1969, Ser. No. 834,391
Claims priority, application France, June 20, 1968, 156,199
Int. Cl. C08f 1/56, 3/06
U.S. Cl. 260—88.2        16 Claims

ABSTRACT OF THE DISCLOSURE

Improved catalysts for the polymerization of olefins which comprise an organometallic compound and the reaction produced of a liquid halogenated derivative of a transition metal and a solid support constituted by an oxide of calcium and/or magnesium are provided. The solid supports for the improved catalysts are obtained by the heat treatment of an optionally hydrated, carbonate or basic carbonate of calcium or magnesium at a temperature between 350 and 1000° C.

BACKGROUND OF THE INVENTION

This invention relates to a process for the preparation of catalysts for the polymeriztion of olefins. More particularly, the present invention concerns a process for the preparation of solid catalysts which can be used for the polymerization and the copolymerization of olefins, particularly ethylene.

In French Pat. No. 1,516,800 dated Oct. 21, 1966 and the addition thereto, No. PV 119,682 dated Sept. 1, 1967, both issued to Solvay et Cie, a process has been described in which the polymerization and the copolymerization of olefins are carried out in the presence of a catalyst comprising an organometallic compound and a solid material having at the surface thereof, catalytic complexes comprising a bivalent metal, a halogen, oxygen and a transition metal carrying halogenated substituents. The solid material can be obtained by reacting in the absence of diluent, a liquid halogenated derivative of a transition metal with a support constituted by an oxygenated bivalent metal compound which is anhydrous and has very few hydroxyl groups. Among the oxygenated compounds which may be used as supports, the oxides are particularly suitable. The catalysts obtained from oxide supports are indeed very active and can be used to produce polyolefins having good properties.

U.S. patent application Ser. No. 676,738 filed on Oct. 20, 1967 now abandoned by Berger et al. corresponds to the above noted French Pat. No. 1,516,800 and its addition.

Since the presence of water or a high concentration of hydroxyl groups is not desirable when preparing the catalysts which can be used to carry out the above process, the supports are in general dried at a temperature higher than 200° C. When the support consists of oxides, it has been observed that in spite of a drying treatment, the properties of the catalyst and of the polymer are extensively modified depending on the nature of the support, and the duration and conditions of storing. Particularly, the activity of the catalyst and the melt index of the polymer can vary to a large extent depending on the source of oxide used as support and the means used to preserve the same. For example, catalysts obtained from magnesium oxides and produced in the same apparatus but at different intervals, can have different activities and produce polymers of different rheology. On an industrial basis, this means that the production of a polymer having constant, specific properties is delicate. Furthermore, the operation of the polymerization apparatuses to produce consistent products becomes complicated.

In addition, the bivalent metal oxides are crumbly and, during handling and utilization as catalyst supports, become more or less eroded and reduced to fine particles.

On the other hand, these supports can disintegrate under the effect of thermal impact which is produced as a result of the susbtantial quantity of calories liberated during polymerization.

It has been observed that the presence of fine catalyst particles in the polymerization mixture may have adverse effects on the structure of the polymer. As a result, the latter becomes fluffy and downy which creates difficulties in transportation and in the further utilization of the product.

SUMMARY OF THE INVENTION

It has now been found that supports made of calcium and/or magnesium oxides which are resistant to erosion and thermal impact may be produced. These supports produce catalysts having constant properties and the polymers prepared therewith are always of the same quality and possess a desirable structure. Further, the present procedure is readily reproducible and yields supports with constant properties.

According to the present invention, improved catalysts for the polymerization of olefins are produced wherein the catalyst comprises an organometallic compound and a solid compound obtained by reaction between liquid halogenated derivative of a transition metal and a solid support constituted by a calcium and/or magnesium oxide, by reparing the solid support by heating carbonates or basic carbonates of calcium and/or magnesium, which carbonates may be hydrated, at a temperature between 350 and 1000° C.

DESCRIPTION OF THE PREFERRED EMBODIMENTS

All the carbonates and basic carbonates of magnesium and/or calcium may be treated according to the process of the invention to be later used as catalyst supports. Among these, the following may be cited: artinite $(MgCO_3 \cdot Mg(OH)_2 \cdot 3H_2O)$ hydromagnesite $(3MgCO_3 \cdot Mg(OH)_2 \cdot 3H_2O)$, nesquehonite $(MgCO_3 \cdot 3H_2O)$ and lansfordite $(MgCO_3 \cdot 5H_2O)$. However, carbonates and basic carbonates of magnesium, in particular hydromagnesite, are particularly suitable. Double carbonates such as dolomite $(MgCO_3 \cdot CaCO_3)$ or huntite $(3MgCO_3 \cdot CaCO_3)$ may also be used.

It is very important to choose carefully the temperature at which the carbonates and mixed carbonates are treated. A temperature higher than 350° C. is required to remove the water of hydration, to decarbonate and to decompose the hydroxides. However, this temperature should not exceed 1000° C. to prevent superficial roasting of the resultant oxide, which would then be practically unfit for the fixation of a halogenated derivative of a transition metal.

Figure 1:
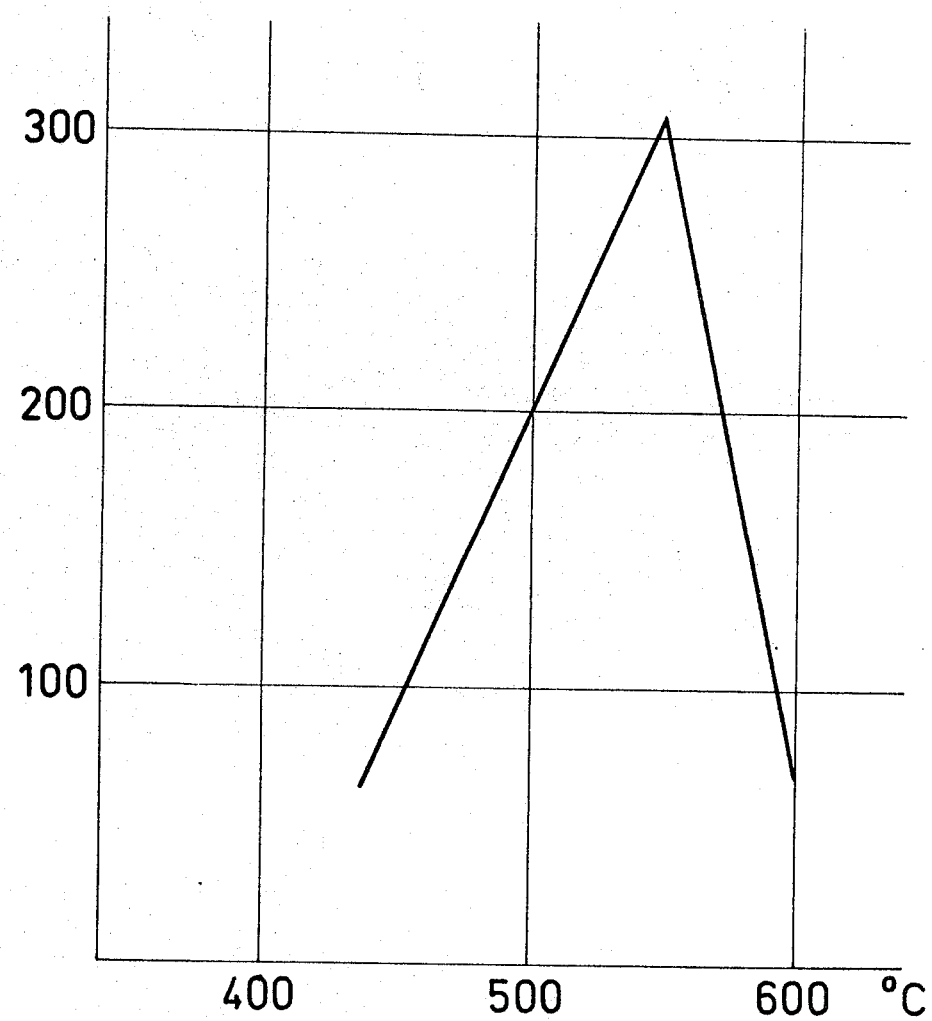
FIG. 1 is a diagram of the activity/temperature curve for basic magnesium carbonate.

To obtain a catalyst having a maximum activity, the treatment temperature should be adjusted within the above-noted range, depending on the nature of the particular carbonate involved. For example, a range between 350 and 650° C. is preferred in the case of carbonates and basic carbonates including hydrated carbonates of magnesium. For every starting compound, under the conditions selected for activation, there is a temperature, in the above range, which corresponds to a maximum catalytic activity. Under these conditions, for basic magnesium carbonate, the temperature should be in the vicinity of 540° C. as indicated in the diagram of FIG. 1. In this diagram, the Y axis indicates the specific activities obtained by using hydromagnesite supports treated under a dry nitrogen atmosphere at the temperatures shown along the X axis. The activity is indicated in g. of polymer per g. of solid catalyst, per atmosphere of $C_2H_4$ and per hour. The catalysts are used in the form of a suspension in hexane for the polymerization of ethylene. The operating conditions, i.e. composition of the catalytic system and polymerization parameters are identical for each test. It is evident that the activity of the catalyst varies to a large extent, depending on the treatment temperature and that there is a treatment temperature that provides a maximum activity.

The preferred temperature range for treating the double carbonate of magnesium and calcium is between 550 and 900° C., and it may vary between 800 and 1000° C. for calcium carbonate.

Figure 2:
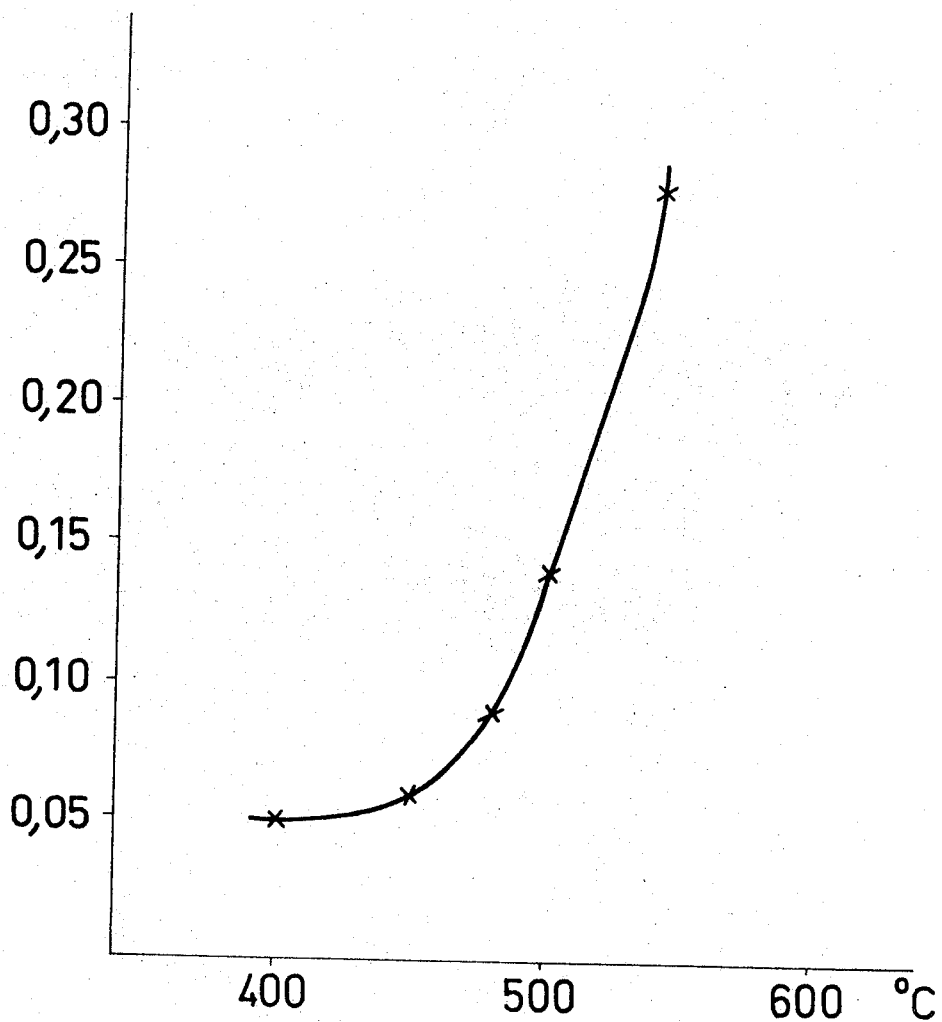
FIG. 2 is a diagram of the melt index of polyethylene with respect to the treatment temperature of the support.

The treatment temperature of the support also has a marked influence on the molecular weight of the polymer and, consequently, on the melt index of the resin. The diagram of FIG. 2 illustrates this influence. The Y axis defines the melt index measured under standard conditions for polyethylenes produced with catalysts in which the supports have been treated at the temperatures given along the X axis, in a flow of nitrogen which is saturated with water. The other conditions used for the preparation of the catalyst and for the polymerization are equivalent. It is seen that the molecular weight of the polymer decreases when there is an increase of the treatment temperature of the support.

The length of the treatment should assure complete dehydration and decomposition reactions. The period required for treatment varies over a broad range depending on many parameters such as type and morphology of the carbonate, temperature and the like. Generally, the treatment lasts many hours and, often, more than ten hours more preferably, the treatment requires about 2 to 20 hours. At the end of the treatment, the supports consist of oxides containing a few hydroxyl groups which are concentrated at the surface of the support in such a manner that the latter are particularly well adapted for the preparation of the catalytic system.

The treatment of the support may be carried out under vacuum or under any gaseous atmosphere, for example in the presence of air, oxygen, nitrogen, hydrogen chloride, etc. The treatment may be carried out under reduced pressure or at atmospheric pressure. An increase of the pressure is not recommended for the decomposition reactions.

The nature of the gas in which the treatment is carried out however controls the activity of the catalyst. For example, under the same treatment temperature, the activity of the catalysts in which the support has been treated under an atmosphere of nitrogen which is saturated with water is often higher than that of the catalysts in which the support has been treated under an atmosphere of dry nitrogen. Similarly, the maximum activity results from a treatment temperature of 500° C. when the treatment is carried out under humid nitrogen, and 540° C. if under dry nitrogen. In nitrogen saturated with water, the treatment is preferably carried out between 400 and 560° C. while in dry nitrogen, the range is 450 to 600° C.

The treatment may be carried out according to known processes for drying solid materials. In particular, a fixed bed, fluid bed, rotary drum, revolving grate techniques and others may be used. After treatment, the support may be directly contacted with the liquid halogenated derivative of a transition metal. If it is intended to store the support, special care should be taken not to pollute the surface thereof. It should be noted that the presence of humidity is harmful.

The liquid halogenated derivatives of transition metals which may be reacted with the support are selected from halides, and preferably chlorides, bromides and from oxyhalides of the metals of Groups IVb, Vb and VIb of the Periodic Table, for example $TiCl_4$, $VOCl_3$, $VCl_4$ and $CrO_2Cl_2$, more particularly among the chlorinated derivatives of titanium and vanadium.

The reaction is carried out in the absence of solvent, at a temperature between 40 and 180° C. Then, the catalyst may, if desired, be extracted by means of the halogenated derivative itself, and washed with a hydrocarbon solvent.

The resulting solid catalyst is activated by means of an organometallic compound selected from the organic derivatives of the metals of Groups I, II, III and IV of the Periodic Table. The activators may include organometallic halides and hydrides, and totally alkylated derivatives, for example dialkylaluminum halides, alkylmagnesium halides, alkylaluminum hydrides, alkyltin hydrides, and organic compounds of silicon having at least one Si—H bond. However, trialkylaluminum compounds are preferred.

As used herein, the term organometallic compounds includes organosilicon compounds in accordance with the usage in Organometallic Chemistry—Selected Topics in Modern Chemistry by E. G. Rochow, Reinhold Publishing Corp., 1964, and The Chemistry of Organometallic Compounds, by E. G. Rochow. D. T. Hurd and R. N. Lewis, John Wiley and Sons, 1957. Organometallic halides and hydrides and completely alkylated derivatives thereof, such as dialkylaluminum halides, alkylmagnesium halides, alkylaluminum hydrides, alkyltin hydrides, and organic compounds of silicon having at least one Si—H bond may be used as activators, wherein trialkyl aluminum compounds are preferred. As examples of such activators triethylaluminum triisobutylaluminum, tri-n-octylaluminum, diethylaluminum chloride, ethylmagnesium bromide, diisobutylaluminum hydride, tri-n-butyltin hydride, triethylsilane, methyl hydrogen silicone oil may be mentioned among the activating compound which can be used according to the present invention.

The amount of activator to be used is not critical as long as there is a molar excess thereof with respect to the amount of transition metal bonded to the support. The molar ratio of the activator to the transition metal bonded is between 10 and 50.

The activation may be carried out immediately after introducing the monomers. It is also possible to allow the catalyst to age for a more or less extended period of time, at room temperature or even higher.

The catalytic system is used for the polymerization and the copolymerization of α-olefins and for example for the production of polyethylene, polypropylene and copolymers of ethylene and propylene. The polymerization and copolymerization may be carried out according to the known techniques: in gaseous phase, i.e. in the absence of a liquid phase, or in the presence of a dispersing medium in which the monomer is soluble. As dispersing liquid medium, an inert hydrocarbon, which is liquid under the polymerization conditions or the monomers themselves maintained liquid under their saturated vapor pressure may be used.

The carbonates and mixed carbonates which can be used for treatment according to the invention have a high resistance to abrasion and compression. As a result, during storing and manipulation, there is very little reduction of the solids into fine particles. Furthermore, the supports produced at high temperature according to the process of the invention have an improved resistance to abrasion and thermal impact. By using the process of the invention, there is a substantial decrease of the proportion of fine particles ultimately present in the catalyst. Consequently, the structure of the polymer considerably improved. The formation of a fluffy or downy polymer which is detrimental when transporting, storing and using the catalyst no longer occurs.

As the preparation of the support is carried out under easily reproducible conditions, the process according to the invention serves to prepare catalysts having highly constant performances and which give polymers of high and consistant quality. Furthermore, by judiciously selecting the treatment temperature, the molecular weight of the polymer may be varied easily without modifying the polymerization conditions or using an additional reactant. For example, by carrying out the treatment at low temperature, such as 400° C., polyethylene having a low melt index and a wide distribution of the molecular weight may be produced. This type of resin is highly valued for blowing flasks and for producing tubes. The widening of the distribution of the molecular weights is obtained for example by polymerization in a mixture having a high concentration of hydrogen: since hydrogen acts as a transfer agent and increases the melt index of the polymer, this increase is compensated by using supports according to the invention which have been treated at relatively low temperature.

The following examples further illustrate the best mode currently contemplated for carrying out the present invention and should not be considered as limiting the scope thereof in any manner whatsoever.

EXAMPLES 1 TO 5

Hydromagnesite ($3MgCO_3.Mg(OH)_2.3H_2O$) is treated in a fixed bed by flushing for 16 hours with a flow of nitrogen saturated with water and operating at room temperature. The temperature of the flushing gas is mentioned in Table 1. The support formed is suspended in pure $TiCl_4$ which is heated at 130° C. for one hour. The reaction product is separated and washed with hexane.

One half liter of hexane, 55 mg. of the reaction product and 100 mg. of triisobutylaluminum used as activator are introduced into a 1.5 liter stainless steel autoclave. The temperature of the autoclave is raised to 85° C. Ethylene is introduced at a pressure of 10 kg./cm.$^2$ followed by hydrogen at the rate of 4 kg./cm.$^2$. The temperature and the pressure are kept constant for one hour by continuously introducing ethylene.

A polyethylene product is obtained in which the total weight and the activity of the catalyst with respect to the weight of titanium used in the catalytic system are given in Table 1. In the same table, there is also given the melt index of the polyethylene formed as measured according to the ASTM D 1238–59 T norm. The resulting product is in the form of small granules, well shaped and without roughness. It flows easily.

TABLE 1

| Example | Temperature of treatment (° C.) | Production (g. of polyethylene) | Activity of catalyst (g. of polyethylene/hour g. of Ti and atm. of $C_2H_4$) | Melt index |
|---|---|---|---|---|
| 1 | 400 | 15 | 320 | 0.05 |
| 2 | 450 | 93 | 7,320 | 0.06 |
| 3 | 480 | 130 | 14,500 | 0.09 |
| 4 | 500 | 121 | 13,880 | 0.14 |
| 5 | 540 | 76 | 11,500 | 0.28 |

It will be seen that the activity of the catalyst varies substantially depending on the treatment temperature. It passes by a maximum. On the other hand, the melt index of the polymer increases when there is an increase of the treatment temperature.

EXAMPLE 6

Hydromagnesite is treated in a fixed bed by flushing with a flow of pure nitrogen for 16 hours at 500° C. The support formed is suspended in $TiCl_4$, the latter being pure and heated to 130° C. for one hour. The reaction product is separated and is washed in hexane.

One half liter of hexane, 55 mg. of the reaction product and 100 mg. of triisobutylaluminum used as activator are introduced into a 1.5 liter stainless steel autoclave. The temperature of the autoclave is raised to 85° C. Ethylene is introduced at a pressure of 10 kg./cm.$^2$ and hydrogen, under a pressure of 4 kg./cm.$^2$. The temperature and pressure are kept constant by continuously adding ethylene.

After a polymerization period of one hour there are collected 106 g. of a polyethylene in which the melt index measured according to the ASTM D 1238–59 T norm is 0.19. The activity of the catalyst is 7480 g. of polyethylene per hour, per gram of titanium and atmosphere of ethylene.

When the activity of this catalyst is compared with that of the catalyst used in Example 4 in which the support has been treated under the same conditions of temperature, it is realized that the activity of the catalyst and the melt index of the polymer vary substantially depending whether the treatment had been carried out under nitrogen saturated with water or under dry nitrogen.

EXAMPLE 7

Dolomite ($CaCO_3.MgCO_3$) having a granulometry between 87 and 125 microns is treated in a fixed bed by flushing the same with a flow of pure nitrogen for 16 hours at 730° C. The support formed is suspended in pure $TiCl_4$, the latter being heated to 130° C. for 1 hour. The reaction product is separated and washed in hexane.

One half liter of hexane, 250 mg. of the reaction product and 400 mg. of an activator comprising triisobutyl aluminum are introduced into a 1.5 liter stainless steel autoclave. The temperature of the autoclave is raised to 85° C. Ethylene is introduced at a pressure of 10 kg./cm.$^2$ and hydrogen, at 5 kg./cm.$^2$. The temperature and the pressure are kept constant by continuously adding ethylene.

After a polymerization period of one hour, there are collected 82 g. of a polyethylene having a melt index of 1.5 (ASTM D 1238–59 T norm). The activity of the catalyst is 3440 g. of polyethylene per g. of titanium and atmosphere of ethylene.

What we claim and desire to secure by Letters Patent is:

1. In a process for the preparation of a catalyst for the polymerization of olefins comprising an organometallic compound wherein the metal thereof is selected from the group consisting of Groups I, II, III and IV of the Periodic Table and a solid compound obtained by reacting a liquid halogenated derivative of a transition metal selected from the group consisting of a chloride, bromide and oxyhalide of a metal of Groups IV*b*, V*b* and VI*b* of the Periodic Table with an oxide of magnesium, the improvement which comprises preparing said oxide by heating $3MgCO_3.Mg(OH)_2.3H_2O$ in dry nitrogen at a temperature between 450 and 600° C., the length of said heat treatment being sufficient to assure complete dehydration and decarbonation.

2. Process according to claim 1, in which the treatment is carried out at atmospheric pressure.

3. Process according to claim 1, in which the treatment is carried out under reduced pressure.

4. A process according to claim 1 in which said transition metal is titanium or vanadium.

5. In a process for the preparation of a catalyst for the polymerization of olefins comprising an organometallic compound wherein the metal thereof is selected from the group consisting of Groups I, II, III and IV of the Periodic Table and a solid compound obtained by reacting a liquid halogenated derivative of a transition metal selected from the group consisting of a chloride, bromide and oxyhalide of a metal of Groups IV*b*, V*b* and VI*b* of the Periodic Table with an oxide of magnesium, the improvement which comprises preparing said oxide by heating $3MgCO_3.Mg(OH)_2.3H_2O$ in nitrogen saturated with water vapor at a temperature between 400 and 560°

C., the length of said heat treatment being sufficient to assure complete dehydration and decarbonation.

6. Process according to claim 5 in which the treatment is carried out at atmospheric pressure.

7. Process according to claim 5 in which the treatment is carried out under reduced pressure.

8. A process according to claim 5 in which said transition metal is titanium or vanadium.

9. In a process for the homopolymerization and copolymerization of α-olefins wherein said polymerization and copolymerization is carried out in the presence of a catalyst comprised of an organometallic activator wherein the metal thereof is selected from the group consisting of Groups I, II, III and IV of the Periodic Table and a solid compound obtained by reacting a liquid halogenated derivative selected from the group consisting of a chloride, bromide and oxyhalide of a transition metal of Groups IVb, Vb and VIb of the Periodic Table with an oxide of magnesium, the improvement which comprises preparing said oxide by heating $$3MgCO_3.Mg(OH)_2.3H_2O$$

in dry nitrogen at a temperature between 450 and 600° C., the length of said heat treatment being sufficient to assure complete dehydration and decarbonation.

10. Process according to claim 9, for the homopolymerization of ethylene.

11. Process according to claim 9, for the homopolymerization of propylene.

12. Process according to claim 9, for the copolymerization of ethylene and propylene.

13. In a process for the homopolymerization and copolymerization of α-olefins wherein said polymerization and copolymerization is carried out in the presence of a catalyst comprised of an organometallic activator wherein the metal thereof is selected from the group consisting of Groups I, II, III and IV of the Periodic Table and a solid compound obtained by reacting a liquid halogenated derivative selected from the group consisting of a chloride, bromide and oxyhalide of a transition metal of Groups IVb, Vb and VIb of the Periodic Table with an oxide of magnesium, the improvement which comprises preparing said oxide by heating $$3MgCO_3.Mg(OH)_2.3H_2O$$

in nitrogen saturated with water vapor at a temperature between 400 and 560° C., the length of said heat treatment being sufficient to assure complete dehydration and decarbonation.

14. Process according to claim 13 for the homopolymerization of ethylene.

15. Process according to claim 13 for the homopolymerization of propyene.

16. Process according to claim 13 for the copolymerization of ethylene and propylene.

References Cited

UNITED STATES PATENTS

| 2,351,998 | 6/1944 | Moschel et al. | 23—201 |
| 2,462,277 | 2/1949 | Naugle | 23—201 |
| 3,214,417 | 10/1965 | Bloyaert et al. | 260—94.9 |

FOREIGN PATENTS

| 6,714,024 | 4/1968 | Netherlands. |

OTHER REFERENCES

Schwob, Chemical Abstracts, vol. 44, 3339 (1950).

Schwob (5753), Chemical Abstracts, vol. 44, 5753 (1950).

Richer et al., Chemical Abstracts, vol. 48, 6660 (1954).

Kirk-Othmer, Encyclopedia of Chemical Technology, 2nd Ed., vol. 12, Interscience Publishers, 1967, pp. 724–729.

JOSEPH L. SCHOFER, Primary Examiner

E. J. SMITH, Assistant Examiner

U.S. Cl. X.R.

252—429 C, 430; 260—93.7, 94.9 DA